(12) United States Patent
Nussupov et al.

(10) Patent No.: US 11,073,127 B2
(45) Date of Patent: Jul. 27, 2021

(54) MULTI-STAGE SLOTTED WIND TURBINE

(71) Applicants: Kazakh-British Technical University, JSC, Almaty (KZ); Kair Nussupov, Almaty (KZ)

(72) Inventors: Kair Nussupov, Almaty (KZ); Iskander Beisembetov, Almaty (KZ); Bagdaulet Kenzhaliev, Almaty (KZ); Nurzhan Beisenkhanov, Almaty (KZ)

(73) Assignee: Kazakh-British Technical University, JSC and NUSSU, Almaty (KZ)

( * ) Notice: Subject to any disclaimer, the term of this patent is extended or adjusted under 35 U.S.C. 154(b) by 40 days.

(21) Appl. No.: 16/307,953

(22) PCT Filed: Apr. 10, 2017

(86) PCT No.: PCT/KZ2017/000007
§ 371 (c)(1),
(2) Date: Dec. 7, 2018

(87) PCT Pub. No.: WO2017/213485
PCT Pub. Date: Dec. 14, 2017

(65) Prior Publication Data
US 2019/0257283 A1    Aug. 22, 2019

(30) Foreign Application Priority Data
Jun. 7, 2016  (KZ) ................................. 2016/0492.1

(51) Int. Cl.
*F03D 1/04* (2006.01)
*F03D 80/30* (2016.01)
*F03D 7/02* (2006.01)

(52) U.S. Cl.
CPC ............. *F03D 1/04* (2013.01); *F03D 7/0212* (2013.01); *F03D 7/0268* (2013.01); *F03D 80/30* (2016.05);
(Continued)

(58) Field of Classification Search
CPC .......... F03D 1/04; F03D 80/30; F03D 7/0212; F03D 7/0264; F03D 7/0268;
(Continued)

(56) References Cited

U.S. PATENT DOCUMENTS 1,767,303  A     6/1930  Miller
2,017,961  A  *  10/1935  Ferral ....................... F03D 1/04
                                                                415/4.5
(Continued)

FOREIGN PATENT DOCUMENTS

CA        2647804 A1  *  6/2010  ............... F03D 1/04
KZ          29908 B   *  5/2015  ............... F03D 1/04
(Continued)

OTHER PUBLICATIONS

ISR—European Patent Office; NL ; Aug. 9, 2017.

*Primary Examiner* — Christopher Verdier
(74) *Attorney, Agent, or Firm* — Patshegen IP LLC; Moshe Pinchas

(57) ABSTRACT

A turbine is provided which effectively converts the kinetic energy of the wind, after its (wind) accelerating, to electrical power. The multi-stage wind turbine, which allows multiple accelerate directed air flow (wind), even of most minimal speed, up to strong wind and convert it's energy into electrical power, is proposed. It is achieved due to modularity of installation, where the wind is accelerated within each module due to the processes of capturing the initial wind flow, injection-ejection and aerodynamic Coanda effect as well, by virtual necks and conical confusors nested one into another. The system of truncated cones and virtual necks with optimum aerodynamic sizes provides the capture of the airflow not only perpendicular to the base of these cones, but also from lateral sides of these cones.

5 Claims, 16 Drawing Sheets

Figure 1:
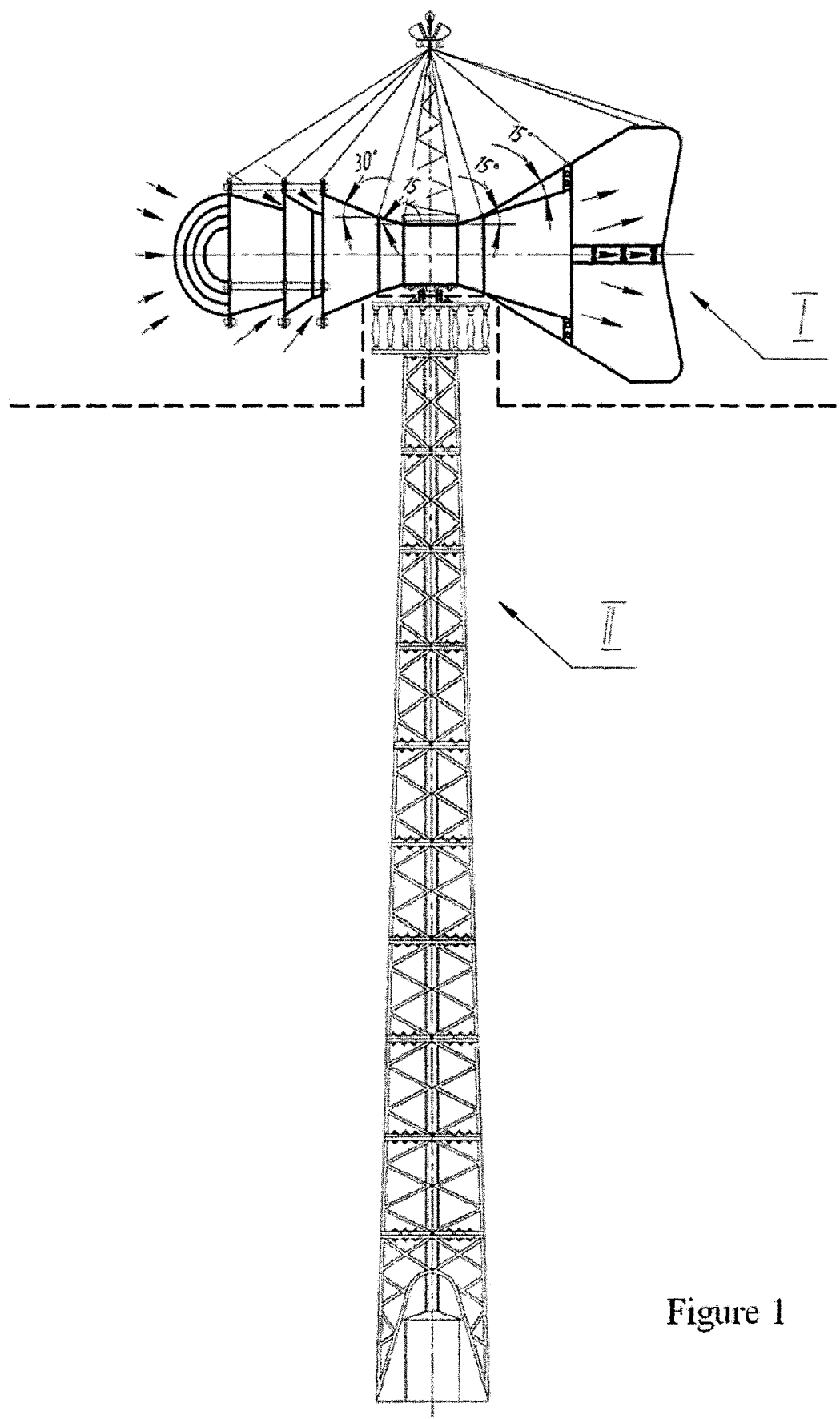

(52) U.S. Cl.
CPC . *F05B 2240/123* (2013.01); *F05B 2240/9121* (2013.01); *Y02E 10/72* (2013.01); *Y02E 10/728* (2013.01)

(58) Field of Classification Search
CPC ................. Y02E 10/723; Y02E 10/728; F05B 2240/123; F05B 2240/9121; F05B 2240/912
USPC .................................................... 415/4.3, 4.5
See application file for complete search history.

(56) References Cited

U.S. PATENT DOCUMENTS

| | | | | |
|---|---|---|---|---|
| 2,330,907 | A * | 10/1943 | Odor et al. | B64C 11/001 415/185 |
| 4,134,708 | A * | 1/1979 | Brauser | F03D 3/0472 415/30 |
| 4,204,799 | A * | 5/1980 | de Geus | F03D 1/04 415/4.5 |
| 10,100,525 | B2 * | 10/2018 | Aranzadi De Miguel | E04H 12/12 |
| 2005/0104379 | A1 * | 5/2005 | Haskill | F03D 9/32 290/44 |
| 2009/0180869 | A1 * | 7/2009 | Brock | F03D 1/04 415/208.2 |
| 2010/0316493 | A1 | 12/2010 | Presz, Jr. et al. | |
| 2014/0331568 | A1 * | 11/2014 | Andersen | F03D 13/10 52/40 |

FOREIGN PATENT DOCUMENTS

| | | | | |
|---|---|---|---|---|
| RU | 2101556 | C1 * | 1/1998 | ............. Y02E 10/74 |
| WO | 2007/148826 | A1 | 12/2007 | |
| WO | 2013/176570 | A1 | 11/2013 | |
| WO | 2016/059278 | A1 | 4/2016 | |

* cited by examiner

MULTI-STAGE SLOTTED WIND TURBINE

The invention relates to the field of energetics for conversion of motion energy of directed air flow (wind) into the rotation of the rotor generator for generation of the electrical power.

A wind-electric power plant (patent RU Jfe2101556, F03D3/04, publ.: 01.10.1998) with the design of pressure and exhaust-action, in which the capture of the wind flow in any direction is carried out by the lateral side of the surface of the wind receiver with guide blades of aerodynamic shape, is well-known. In this section happens preliminary acceleration of wind flow by the system of local forcing of speed with using the guides of booster planes. Then the wind stream enters into an extended wind receiver - an exhaust pipe, which is provided with internal and external moving shutters capable to move across the surface of the wind receiver independently of each other, intended to regulate the volume and mass of air flow, guided by the blades into the pressure chamber. Pressure chamber having a various cross sectional area along the whole length, accumulates the incoming air volume and thereby converts the dynamic wind pressure into static air pressure. At the narrowest point of the pressure chamber is located wind wheel, connected by a long shaft with a generator, placed on the surface of the Earth. Exhaust pipe expands behind the wind wheel, resulting in rarefaction of air flow. As a result, the wind pressure falls behind the wheel as compared with the static pressure in front of the wheel. This leads to appearance of traction and exhaustion of air from the pressure chamber and thereby to increasing of the wind velocity. Additional rarefaction and increasing of the air flow speed is implemented by working nozzle, placed between two boost nozzles on the end of the upper part of the exhaust pipe. Thus, high efficiency of wind turbine is provided by the presence in the exhaust pipe of the two air flows: pressure and exhaust actions that adding up, provide a high velocity of directed air flow.

However, practical implementation of the proposed wind turbine is associated with considerable financial investments. Another disadvantage of this turbine is the complexity of its manufacture. Also it should be noted non-obviousness and doubtfulness in reliability of such high plant efficiency, providing by the author compared to the prototype.

Corporation Fu-jin (Japan) delivers on the market high-performance wind turbines of the tubular type. These wind turbines have replaced wind turbines with large diameter blades. As is known, the more working surface of the blades, the greater the amount of produced electricity. This led to large size of wind turbines which had not permitted to create wind turbines of even larger sizes due to small area of Japan to satisfy the growing electricity needs. In addition, accompanying disadvantages of large-sized wind turbines (biological, acoustic, electromagnetic, etc.) forced the Japanese to abandon their manufacture. A new generation of wind turbines with blades diameters not exceeding 1 meter and placed in confusors, allowed to increase the wind speed. Placing blades with a diameter approximately equal to the diameter of the small base of the truncated cone (confusor), where this blade is located inside the tapered tube, also allows avoiding the power losses of 20 to 30% at the ends of the blades and influence of the turbulence. These wind turbines are capable to generate electricity even at low speeds of rotation and are free from a number of disadvantages, of previous generations of wind turbines. The small sizes of tubular wind turbines allow placing a few pieces on one mast simultaneously.

The disadvantage of this class wind turbines is the lack of protection against hurricane winds. Another drawback of these wind turbines is the lack of diffuser, allowing to minimize the turbulence behind the blade and to create a traction that arises due to the reduction of air flow pressure behind the airscrew to additional increase of the wind speed.

In the patent (RU No22327056, FO3D1/04 publ.: 20.06.2008), a highly effective wind turbine based on an aerodynamically profiled diffuser is proposed, where a rarefaction of exhaust airflow behind the blade for increasing of the wind speed is used. As above-described two patents, this wind turbine has also pressure- and exhaust action. Traction is generated due to the difference of the air flow pressure before and behind the blade. To the advantages of this wind turbine should be included, as in the previous patent, the minimal losses of useful power in a peripheral part of the blade due to the inability of the wind flow access to the rear part of the blade.

The prototype of the claimed invention is a multi-stage wind turbine (patent KZ No229908, FO3D 1/04, publ.: 05.15.2015), allowing to obtain energy due to the power selection from both the main air flow along all height of the turbine, and from air flows arising at different stages of the turbine during the ejection. The turbine consists of mobile and fixed parts. The upper mobile part of the turbine by means of the weather vane is oriented according the wind, and through the wind receiver captures the main air flow. Fixed wind receiver except the last stage, consists of several consequently connected modules, each of which represents the not full Venturi tube consisting of only short confusor and short virtual neck without diffuser, wherein the height, the average diameter of confusor and the diameter of the virtual neck with optimal aerodynamic sizes gradually decrease from top to bottom, from stage to stage in the direction of the wind generator, located at the Earth's surface.

First stage of a wind turbine is oriented with the help of the weather vane according the wind direction. Wind receiver with aerodynamic cavity directs the captured wind flow to the second stage, consisting of a short confusor and short virtual neck with optimal aerodynamic sizes and angles. On this section, the wind flow accelerates and enters into a virtual neck. The neck has no walls and therefore, on this section, the downward wind flow has not aerodynamic resistance of the neck walls due to their absence. On this section, suction of an air mass happens from the environment through the lateral confusors by the downward wind flow going from the wind receiver. Lateral confusors are formed by peripheral concentrators and provide air suction along all necks perimeter. Moreover, on the same area, in one or two sections, the receipt of the directed air flow (wind) is implemented. This air flow causes additional air suction from the environment. Thus, strengthened wind stream then arrives to the third stage of wind turbine and, the physical process described above is repeated. The same thing happens at the fourth and fifth stages. And finally, this wind of significant strength enters the fifth stage, is accelerated by confusor, and begins to rotate the blades of wind turbine. The exhaust air flow by means diffuser and aerodynamic guide through a cylindrical grid is output into the surrounding area. Dynamic loads on the blades are increased at sufficiently high speeds of the wind flow, and they may be destroyed. Therefore, at hurricane wind, it is better to use the wind turbines or even special turbines for large wind loads.

As disadvantage of this turbine should be assumed the changes of the wind flow direction between the moving and stationary parts of the turbine. This leads to slow down the speed of the wind compared to its original magnitude. Also can be noticed that the device is not mobile, there are difficulties in transporting from one place to another, as well as during assembly and disassembly of the wind turbine.

OBJECT OF THE INVENTION

To increase the power generated by wind turbine with relatively small airscrew diameters, which can provide sufficient power without the use of additional power sources at any time at wind speeds above the minimum (1 m/s).

To provide biological, acoustic, electromagnetic and mechanical safety of the environment.

Essence of Invention

The goal is achieved by using three components included to the formula to calculate the mechanical power (contained in the wind flow) of a wind turbine, which is given by:

$$P \infty pa = 0.5 \hat{} - \rho.S - V^3 \quad (1)$$

where $\xi$—dimensionless factor of wind energy utilization (WEUF), which, according to A. Betts and Zhukovsky N.E. for high-speed open-type wind turbines (with blades, not enclosed in confusors and diffusers) can not exceed the value=0.593; S is delineated by blades the area of wind wheel, m2; V—speed of the wind in m/s; $\rho$—air density of 1.23 kg/m3.

Analyzing the equation presented above, it should be noted that the vast majority of traditional wind turbines is based on usage only one variable—S—area, delineated by blade. So, it is necessary to increase the area, delineated by blade, for increasing the power generated by the wind turbine, which inevitably leads to an increase in the size and weight of wind turbine. Simultaneously, the cost and degree of environmental incompatibility of wind turbine to the environment are increased.

Furthermore, according to this formula, the power generated by wind turbine depends linearly from the area, delineated by blade, whereas this formula has stronger variable value in the cubic degree—the wind speed V, the increase possibilities of which has not been used by mankind for centuries. If in the future, the designers of wind turbines will be based only on the area, delineated by blade, as a base parameter, then without a doubt, is the dead-end direction, which will not allow to mankind to solve its energy needs.

It follows from the formula presented above that the increase in twice of wind speed increases the produced capacity of wind turbine by 8 times! While the increase in twice of the area, delineated by blade, increases the power by 2 times only. Hence it is evident the necessity of elaboration and creation of a wind turbine capable to increase the speed of the required wind flow. Currently, there are means to do so, although they existed before, but began used for this purpose recently. These are confusors and diffusers, which gradually began to be used in the wind industry. Confusors promote to an increase in wind speed in blade direction and create high wind pressure before the blade. Diffusors increase the wind speed due to the falling of the pressure behind the blade as consequence of the air flow rarefaction. However, their potential possibilities in wind energetic are not sufficiently studied and increasing of their effectiveness is subject to further work in this direction.

According to the theory by A. Betts and N.E. Zhukovsky, for the ideal open-type wind turbines (with blades, not enclosed in confusors and diffusers) wind energy utilization factor (WEUF) can not exceed the value of 0.593. However, in the case of placing the blades in a limited space in form a confusor or diffuser, criterion of Betts and Zhukovsky is violated and the value of $\xi_{max}$ can reach a value of 2-3 times greater than the magnitude of 0.593, consequently, the power generated by wind turbines is increased by 2-3 times.

Thus, compact high-performance multi-stage wind turbine is proposed, in which three values, included in formula for determining the mechanical power contained in the specific wind flow, will be used. Namely, the wind speed V in third degree, which is increased in comparison with the original speed value, by several times enlarged WEUF, the area of the capture of the wind flow from the lateral surface due to the injection-ejection, which is increased by several times, and small size of the area S delineated by blade of the wind wheel (diameter of about 1-2 meters or more). Blades of diameter of 2 meters and more, depending on the number of stages, allow producing significant electrical power, and can be used for industrial applications in design of a wind farm. In general, the diameters of the blades can be increased up to a reasonable sizes, in order to together with such factors as the wind speed in the cubic degree, WEUF increased by several times and number of stages, obtain the required power from the wind turbine of optimal size and design. In this case respectively the diameter and length of confusors will be increased. The optimum angles of their disclosure will be changed. The sizes of the virtual throats and Venturi throats will be also increased, as well as the sizes of the diffusers and stabilizers. Thus, will also be changed the optimum angles of the diffuser disclosure. Special transport devices and cranes for their transportation may be required.

Below is proposed a compact, high-performance wind turbine with blade diameter of not more than 1 meter, which are capable completely satisfy the energy needs of small settlements such as farms, distant farms, camps, etc., and create on their basis complex of wind farms of middle power for small manufactures and desalination of large volumes of salt water of the seas and oceans. In addition, almost twenty-four hours production of electricity by wind generator throughout the year will allow carrying out the electrolysis of sea water to produce hydrogen and oxygen in order to preserve and accumulate the green energy.

In the basis of proposed invention are laid also the ideas, allowing eliminating listed weaknesses of analogues and the prototype of a new generation of wind turbines. The analysis of disadvantages of the well-known wind farms in operation, and newly designed, has not show any perspectiveness of open type wind turbines. In conventional open-type wind generators is impossible to use pressure drop of air flow before and behind the blade. This is due to the movement of the higher pressure air before the blade to the low pressure zone behind the blade. Thereby is lost an opportunity of additional increase of the wind speed due to the traction which arises due to the pressure difference. It also should be noted that the presence of traction behind the blade prevents an occurrence of turbulence. Furthermore, in design of the proposed wind turbine is provided the possibility to transmit a small portion of the wind stream with the high speed near the wall of the neck in the front of airscrew to the rear part of the airscrew, where the wind speed less. For this purpose, in the construction of wind turbine is provided a virtual slit formed as a result of the small difference of the diameter of the airscrew and the inner diameter of the neck. The blades of airscrew during the rapid rotation form a likeness of continuous disc within the neck, and thus, a virtual slit arises between the inner diameter of the neck and disc. Virtual slit additionally increases the speed of the near-wall wind compared to the speed, which has the air flow before the airscrew. This rapid air flow behind the slit carries away the exhaust air flow with a low rate, which was behind the airscrew. As a result behind the blades an area with significant rarefaction is created and, thereby, traction occurs due to the pressure difference in the front and behind the blades. Formed traction sucks the pressure air, existing in the front of the airscrew, and thereby further increases the speed of the air flow. Thus, generated pressure-exhaust system increases the rotational speed of the airscrew and, consequently, the power generated by the wind turbine. The presence of the virtual slit prevents the formation of turbulence of exhaust wind flow and an avulsion of the air mass from the diffuser walls at sufficiently large angles of diffuser disclosure. In turn, the large angle of diffuser disclosure contributes to occurrence of further rarefaction of airflow after the blades. In addition to the above, to improve the aerodynamic performance of the diffuser at a certain distance from the neck, diffuser is divided to two equal parts by a vertical plastic plane. This vertical plastic wall serves as an additional diffuser, preventing airflow turbulence during its further movement within the main diffuser in a predetermined direction, and promotes to increase of its speed to rapidly withdraw the air mass coming from the neck. Moreover, placing the airscrew in the neck of the Venturi tube, it is possible to achieve greater rarefaction of airflow behind the airscrew due to a sharp drop pressure of the wind flow in the neck according to the properties of the classical Venturi tube. This circumstance also contributes to additional increase of traction.

Posed problem is solved with the use of system of the virtual necks and confusors, which accelerate the wind flow in the direction of the airscrew. In order to significantly increase the speed of the wind flow incoming on the blades, is used not one confusor but a system of short confusors satisfying to aerodynamic requirements of the minimum losses of the air flow speed due to the friction of confusor walls. In addition, the short virtual necks are used, which do not have a cylindrical walls as at necks of conventional classical Venturi tubes, in order to minimize the friction of the air flow on these walls and for minimizing the divergence of the wind flow. These necks is calculated in the same way as conventional, real necks with cylindrical walls.

Three-stage system of confusors with two virtual necks and one real neck with optimal aerodynamic sizes and angles of confusors disclosure can increase the wind speed of 1 meter per second at the entrance to the first confusor, up to 8 m/s at the entrance of the neck, where the airscrew is placed. Consider the possibility of this system in more detail at a specific example. The restrictions were imposed in the calculation of the system, that the maximum diameters of the diffusers and confusors should not exceed the height and width of the vehicle body. For example, body dimensions of available truck KAMAZ 65117 with awning are equal $2400 \times 2500 \times 8000$ mm$^3$ (width×height×length). That is why the maximal diameter of confusors and diffuser was chosen to be less than 2400 mm, and was estimated to 2210 mm. Basing of this size of confusors of the three-stage system, the diameter of airscrew was calculated, which according to estimates amounted to 770 mm and corresponding to this diameter an area, delineated by blades, is about 0.4654 m$^2$. Cross-sectional area of the neck, where the airscrew is located, is about 0.4776 m$^2$. Area of the wind flow, captured by base of entrance confusor, is about 3.834 m$^2$. For multiple increasing volume-mass of air before the airscrew, two last confusors are provided with "skirts" with optimal aerodynamic sizes and angles, that allows to capture the additionally accelerated wind flow from the lateral surface of the wind turbine. Capture of airflow by lateral surface of system occurs due to external wind flow, injection-ejection and the Coanda effect. The area of the lateral surface is about 10.7 m$^2$. It is seen that the area of capturing of the wind flow by lateral surface of the wind turbine is much larger of base area of entrance confusor. Consequently, the overall wind flow capture area is 14.52 m$^2$. This value corresponds to the area delineated by blades of airscrew with diameter of about 4.3 meters. Wind turbine with such diameter of the airscrew theoretically can generate power more than 6.5 kW. Of course, this amount of power is an estimated value because the generated power of wind turbine depends on many factors: the turbulence of the wind flow in passing confusors and virtual necks, the negative effect of friction forces on the walls of wind turbine on the wind speed, nonoptimality of selected geometric sizes of turbine etc. Taking for this system the Betts criterion equal to 1.2, it is not difficult to calculate the power of wind turbines using the above formula, if the wind speed at the entrance is 1 m/s. The power is approximately 5.5 kW, which is 18% different from the above value. Even if the limiting factors of the power of wind turbines for proposed system constitute the half of the above mentioned values, the efficiency of such wind turbines is much higher than the efficiency of similar turbines presently existing in the market. It should be noted that this power is obtained only by the pressure part of wind turbines before airscrew, excluding the power developed by the exhaust system of wind turbine located behind the airscrew. It should be added that the concentrators adjoin to the base of the entrance confusor, which also increases the wind speed. This component of the increase of wind speed by the concentrators also was not taken into account at the calculating the power in accordance with the above given formula. Undoubtedly, the accuracy of the above power values should be experimentally checked in the future. If the number of stages is decreased, the airscrew diameter is increased up to 1 meter at the same diameters of diffusers and confusors. Conversely, the airscrew diameter is decreased with increasing the number of stages. The above example demonstrates the high efficiency of the proposed system.

The mast is made modular to minimize the weight and overall dimensions and facilitate its mounting, dismantling and maintenance without the use of the crane.

The lateral surface of the confusor system and concentrators are covered with mosquito nets to prevent entering into the system birds, garbage, etc.

To minimize the negative influence of the aerodynamic effects of pitch, yaw and roll on a stable and steady operation of wind turbine, causing rapid wear of the bearings, as well as to prevent its response to the occasional rapid changes in direction of the air flow, wind turbine is equipped with four stabilizers—two horizontal and two vertical. The vertical stabilizers at the same time play the role of sensitive wind vane, turning the wind turbine at minimum wind speeds 1-2 m/s. Stabilizers provide an orientation of wind turbines in the direction of the wind only at long and significant change of wind direction.

To further increase stability and sustainability of the wind turbine, weather vanes and turbine protection system against hurricane operate independently of each other. The protection starts working when the required value of wind speed in a given direction is reached, whereas the wind vanes react only to changes in wind direction. Protection is made according to the classical scheme—the axis of wind wheel is offset on small value in the range of 5-10 cm relative to the vertical axis of support-mast or relative to the axis of the generator fastening. Protection using lateral shovel in the case of high wind speeds is not applicable and is associated to risk of destruction of the turbine. Moreover, at placing wind generator within the neck, the protection with lateral shovel increases the size of the neck and reduces the efficiency of wind turbine due to the presence of significant open space on the periphery of the blade.

Wind turbine consists of two parts: fixed and movable. The movable part of the turbine consists of concentrators, confusors, mosquito net, necks, diffusers, power spire, power frame, vertical and horizontal stabilizers as well. An airscrew is located inside the Venturi neck and is connected to the conical multiplier and the shaft which is connected to a generator placed at the top of fixed mast section. Airscrew and conical multiplier are protected against hurricane winds. Alternatively, wind generator can be placed on the surface of the Earth, being connected to the airscrew by means of a shaft and bevel gears, that certainly would be related with some design changes without compromising the basic idea. Moreover, the airscrew and generator can be located directly in the neck. It is desirable that the center of gravity of the movable part of the plant was located on the axis of the tower (the mast-support). There is an openable hatch sideways of the neck for the service of airscrew and replace of the transmission, or the wind generator. The spire is mounted to the power frame and the royal crown is placed on its top for protection of wind turbine from lightning strikes. The system of confusors and diffusers with stabilizers is secured to the spire by steel cables. All the movable part of wind turbine can rotate under the pressure of the wind on the weather vanes.

Power frame via a power bearing is secured on the fixed part of the power tower. At the top of the fixed power tower-support where the wind generator is located, there is a quadrangular platform for placing the staff during a monthly preventive maintenance and repair of wind turbines as needed. Fixed part of the tower-support in this particular embodiment consists of separate sections of 1.8 meters in height, connected together by bolts. Such modular design allows easy assembling the tower of desired height without the crane. Sequence of assembly starts from the bottom from the section with height of 3 meters. This section in case of absence of concrete for the construction (in rural areas) can be fixed by four screws, screwed into the ground. After its fixing, two installers climb stairs to the platform and fasten a light and quickly collapsible lift by bolts, and throw through it steel cable of the winch, on the free end of which is secured the section which should be raised. Not far from the first section, the screw is screwed into the ground, on which the winch is fixed. Firstly, the load rises to the desired height with the help of the winch, and then after pulling of the simplest stopper in the form of stud from the crossbar, the crossbar together with the load can be moved in a horizontal direction up to alignment of the axis of rising section with the axis of the tower. Each section is equipped with a stair and a platform for placing installers during assembly and disassembly of the mast-support. Stairs and platforms produced from plastic, to reduce the cost of wind turbine and for saving the metal. On the axis of each section, there is a tube made of plastic, wherein the cable is located, intended for transfer of generated electricity from the generator to the consumer. After fastening the second section to the first section, lift is disassembled and reassembled on the second section. The third and subsequent sections are assembled in the same way as the second section. The moving part of wind turbine is assembled on the Earth's surface.

To minimize the cost of wind turbine and to reduce the use of natural materials, as well as to reduce the weight of the turbine, all confusors, diffusers, stabilizers, neck, concentrators, platforms for service of turbine, stairs, tubes, located in the center of each section, are made of plastic, capable of operating in conditions of extreme continental climate.

THE IMPLEMENTATION OF THE INVENTION

In the FIG. 1, a general view of a three-stage wind turbine is presented. The turbine consists of movable I and fixed II parts. The movable part of the turbine is the wind receiver. The fixed part of the turbine is the tower-support (mast). In this figure, for ease of perception, only the central part of the mast (it's rod) without stairs and fences for the safe service of the turbine is shown.

Figure 2:
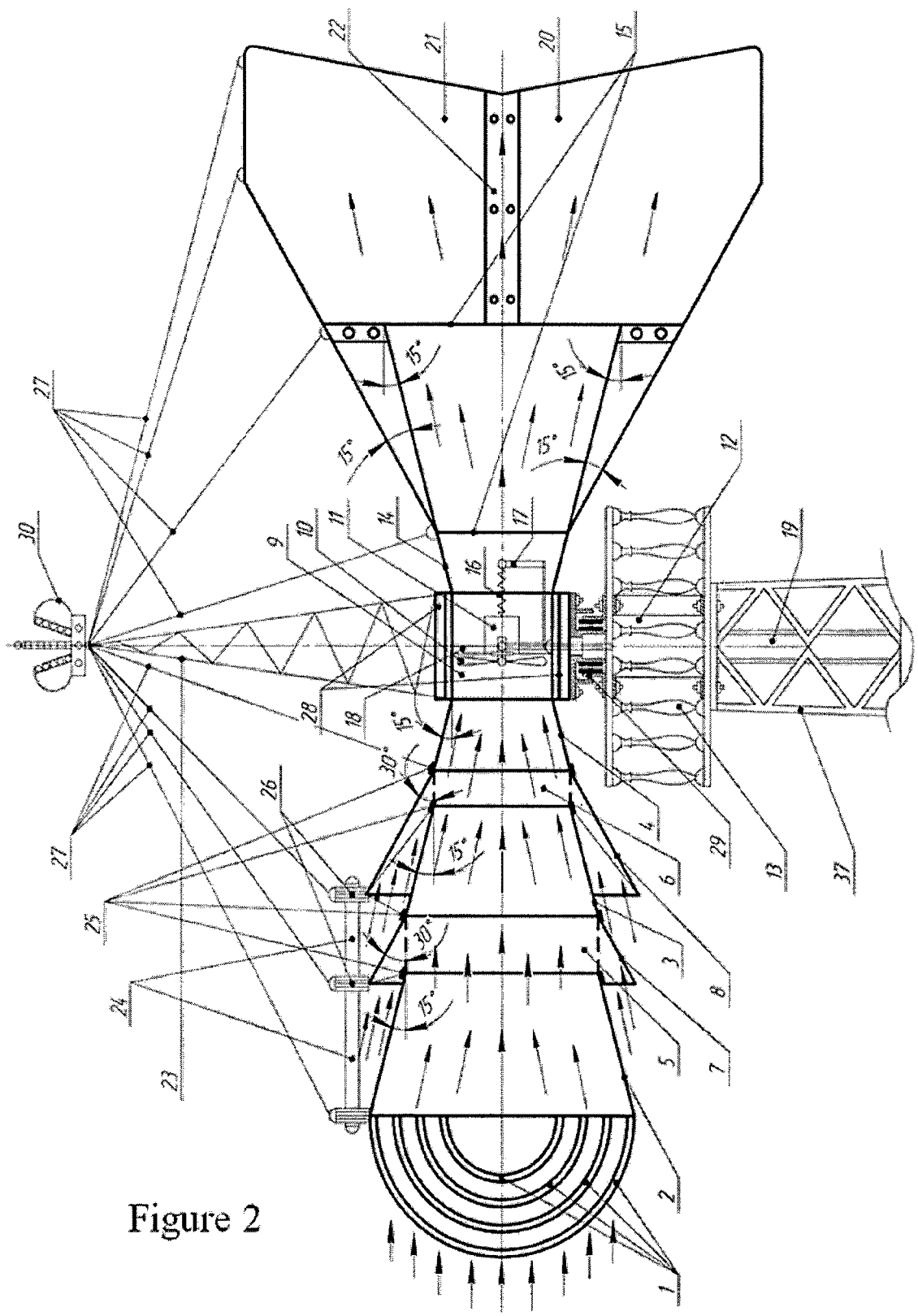

In FIG. 2, the enlarged view of three-stage wind turbine taken in a cut along a vertical plane is presented, which contain the concentrators 1, formed as the rod semirings of optimal aerodynamic form. In this stage happens preliminary increase of the wind speed. Gradually tapering central confusors 2, 3 and 4 with optimal aerodynamic sizes and angles allow to implement subsequent increase in wind velocity.

To minimize the loss of wind velocity on the friction on the walls of confusors, the last have small estimated length and corresponding angles disclosure not exceeding 30°. Virtual necks 5 and 6 formed between the confusors have optimal dimensions for the airflow passing through them. An additional volume of air flow due to injection-ejection, the Coanda effect and wind flow, passing outside of wind turbines, is supplied to the moving part of wind turbine the entire perimeter of the necks through the peripheral confusors 7 and 8. If the speed of the additional air flow is small compared to the wind speed after the second central confusor, it is entrained by this flow and speeds are aligned. If the velocity of the additional air flow is high as compared to the wind speed after first central confusor, it entrains this central flow and the alignment of speeds are also taken place. The maximal diameter of peripheral confusors should not exceed the maximal diameter of the central intake confusor. Peripheral confusors have a disclosure angle of 60°, which is optimal for the wind flow. Area of lateral capturing of the wind flow is much higher than area of the base of intake confusor. Therefore the total area capturing of the wind flow will significantly exceed the cross area of the Venturi neck 9, where are located the airscrew 10 and the box with a bevel gear 11, in the case of placing of generator 12 in the top module 13 of the fixed mast-support. As an alternative, is possible a placement of generator instead of the gear box 11. As a result, the air dam with a high speed is formed in the front of the airscrew. Part of this air flow of high speed through the virtual slit formed by the peripheral part of the airscrew and the inner diameter of the neck 9, enters to the rear side of the airscrew and entrains the exhaust wind flow of considerably lower speed. Behind the airscrew, a considerable rarefaction of the air flow is formed, and thus, a traction arises, additionally increasing the efficiency of wind turbine.

It should be also noted that the wind stream passing through a virtual slit prevents the turbulence and the separation of the wind flow from the wall of diffuser 14 in the case of a large disclosure angle, in order to reduce the diffusor length. At some distance from the neck 9 inside the diffuser 14, there is a vertical partition 15, which divides the diffusor into two equal parts and thereby increases the velocity of the exhaust wind flow in the required direction. The height of the partition exceeds the diameter of the diffuser. It also creates an additional rarefaction behind the airscrew and promotes to laminar flowing of air stream. The partition 15 acts as an additional diffuser similar to diffusers of high-speed sports cars, placed under the rear bumper to help the air flow from under the bottom of the car faster move in the required direction, thereby increasing the speed of the car and its aerodynamic performance.

Gearbox (or generator) 11 through the spring 16 is connected to the fixed pillar 17 attached to the power frame 18. Electrical cables for electric power transmission to the consumer and the ground wire are inside the tube 19.

Two vertical stabilizer 20 and 21, as a continuation of the partition 15, forms a sensing weather vane of a large area to rotate the movable part of wind turbine at the minimal wind speeds of 1-2 m/s. Moreover, the vertical stabilizers permit in greatly extent to suppress the influence of aerodynamic effect—yaw, which favorably affects on the stability of work of the wind turbine. Vertical stabilizers are connected with each other by the mounting plate 22.

Wind turbine also consists of the central power spire 23, on which accounts a significant load, consisting of the weight of the moving parts of the wind turbine, including the weight of spire and pressure of the wind flow. Confusors are interconnected by two rods 24 and supplied by power pressure rings 25, which can withstand the wind pressure. These rings are mounted through sliding fit to the confusors 2, 7, 3, 8 and through the fingers 26 are connected to the rods 24.

All the elements that make up the main artery through cross-cutting passage of the power wind flow, by flexible steel cables 27 are connected to the spire 23. Thus, these elements of wind turbine are secured on the spire 23, which bears the main weight load of these elements.

Spire 23 is secured on the power frame 28, to which is also attached the power frame 18. The power frame 28 is attached to bearing assembly 29 which separates the moving part from the fixed part of the turbine.

For protection against destruction at lightning strikes, the wind turbine is equipped with a lightning rod in the form of a royal crown 30.

Figure 3:
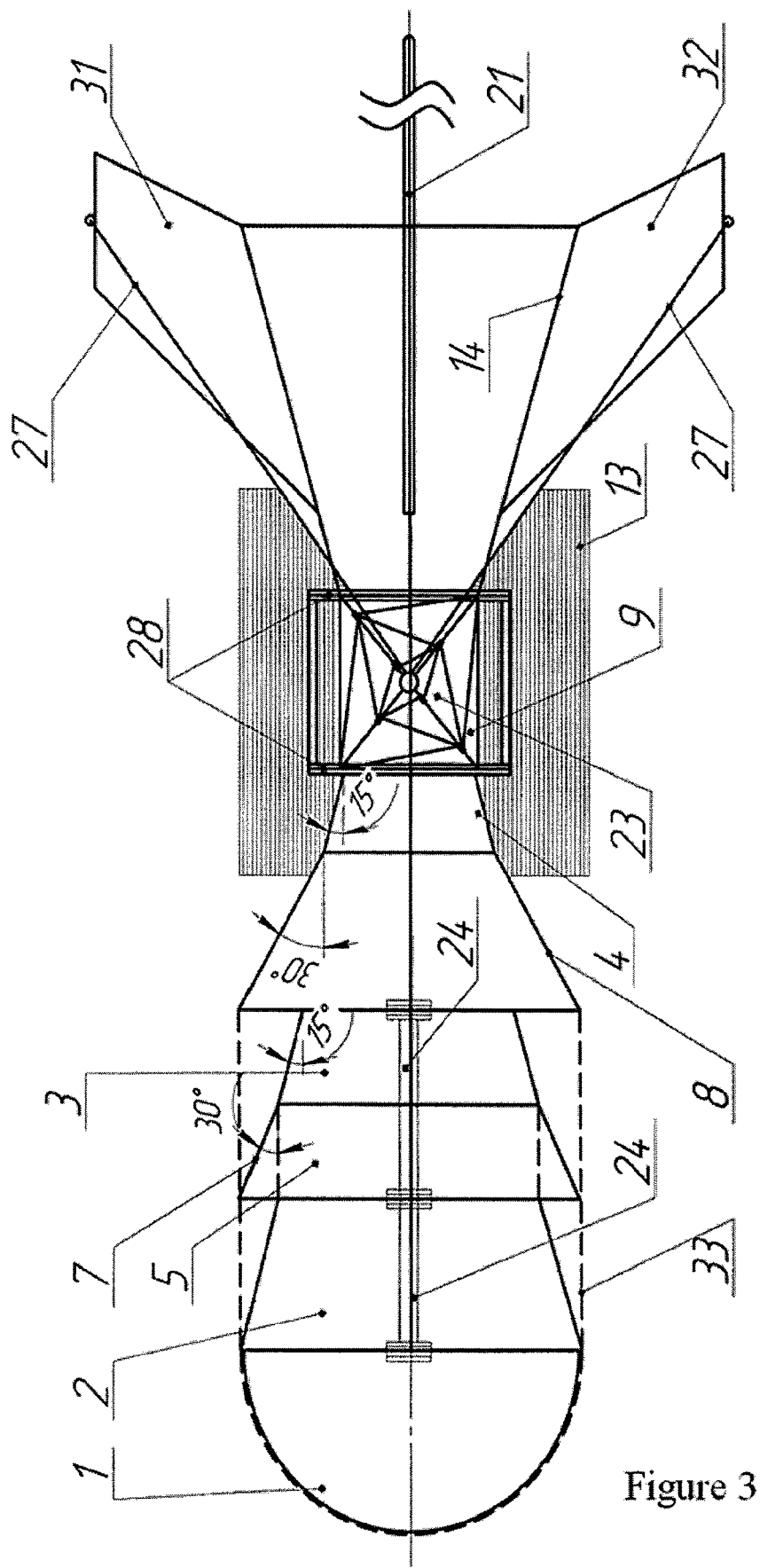

In FIG. 3, a top view of three-stage wind turbine is presented.

Two horizontal stabilizer 31 and 32 are designed to reduce the influence of aerodynamic effects—pitch and heeling on the bearing wear during rapid changes of the wind in the vertical direction and turbulence.

Stabilizers allow for wind turbine do not respond to rapid and random variations in the air flow direction and thereby ensure its long-term stable and steady work. Moreover, due to the stabilizers, the wind turbine reacts only on significant and prolonged changes in wind direction.

The contours of the mosquito net 33 are schematically shown, which is stretched on concentrators 1 and the entire length of the lateral surface of the wind flow capture (total length of the intervals between the vertexes of confusors 2, 7 and 8).

Figure 4:
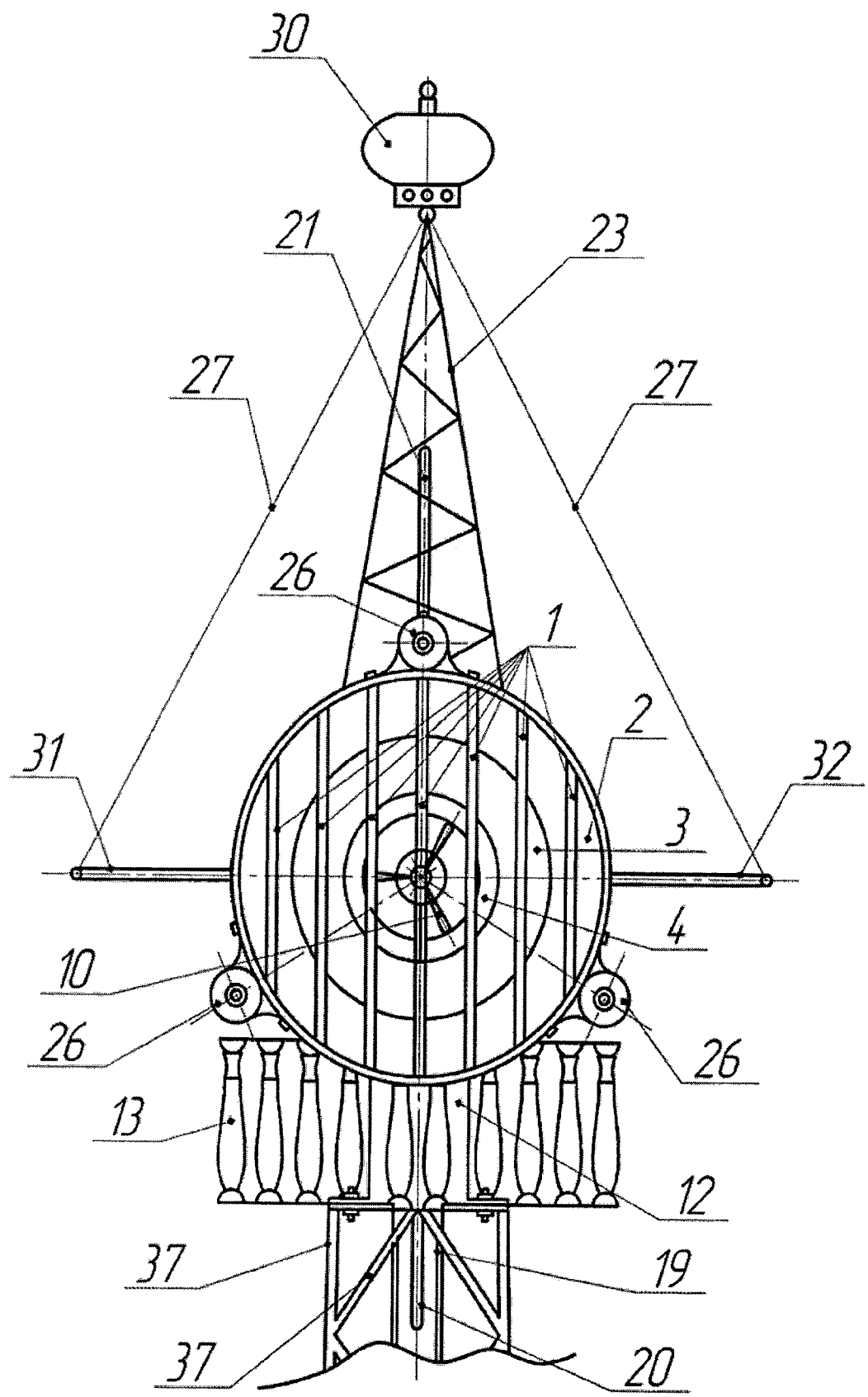

In FIG. 4, a front view of a three-stage wind turbine without mosquito nets is presented. Seven concentrators 1 with the identical aerodynamic shape are located at equal distances from each other.

Figures 5A, 5B:
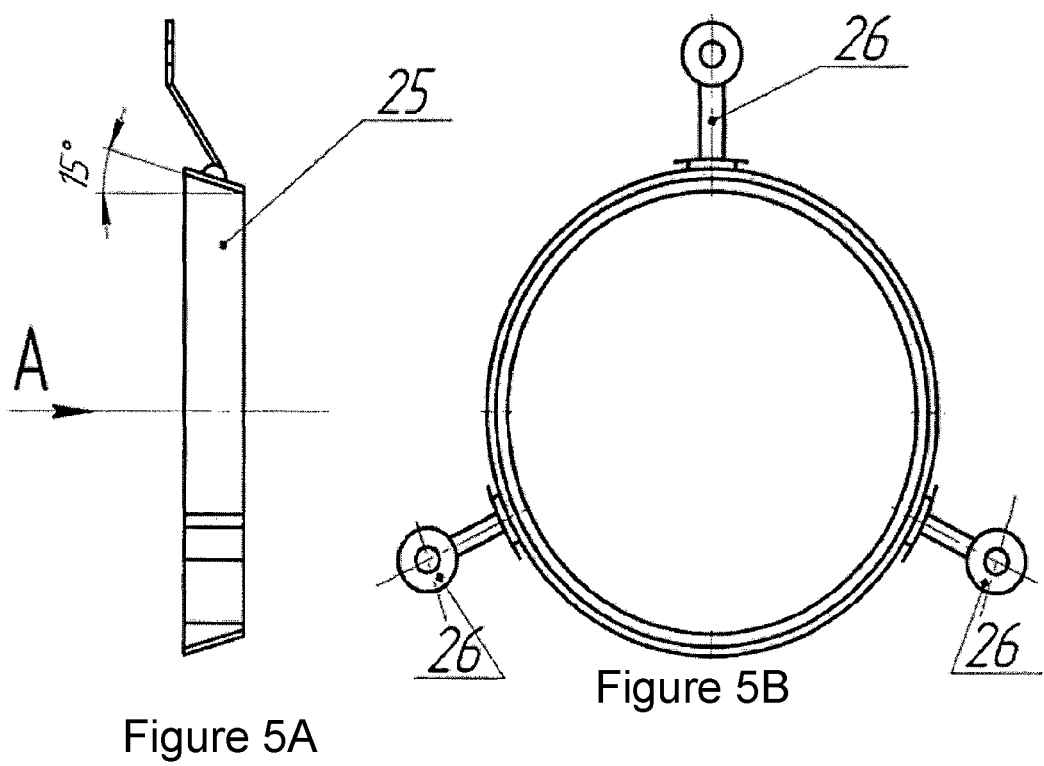

In FIGS. 5A and 5B two projections of the design of the pressure rings 25 are shown (FIG. 5A—lateral view and FIG. 5B—view along arrow A) which by the fingers 26 are secured to the rods 24.

Figure 6:
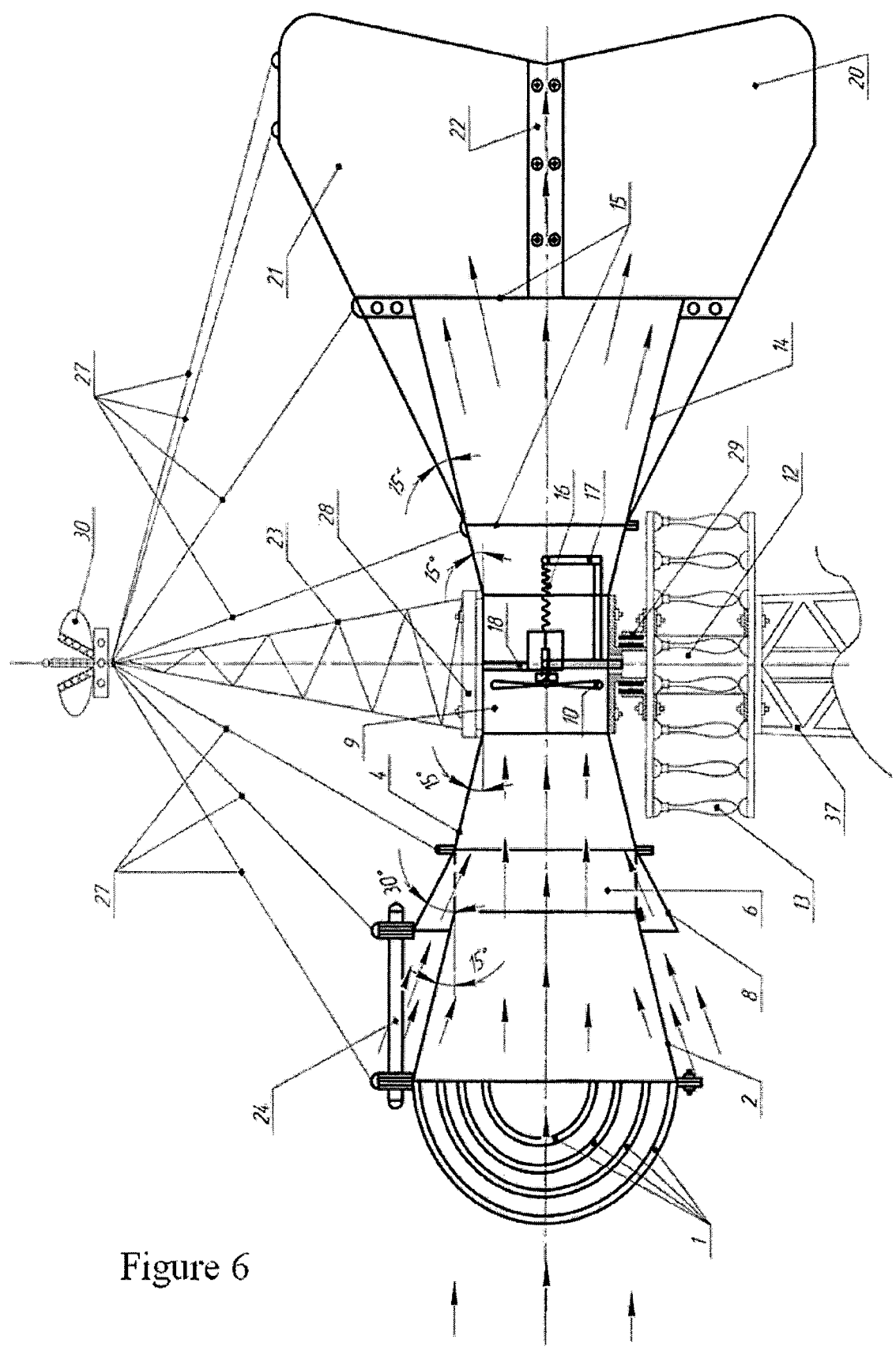

In the FIG. 6 functional working part of the two-stage wind turbine in enlarged scale is presented. Numbering of elements of the two-stage- and single-stage-wind turbines are almost identical to the numbering of the three-stage turbine and have the same functionalities. The principle of operation of the movable part of this turbine is similar to the principle of the three-stage wind turbine. However, due to lack of one functional operating stage, power generated by this turbine is significantly less than the power generated by the three-stage wind turbine, as the area of wind flow captured by the lateral surface of this turbine is substantially smaller than the area of capture of the three-stage turbine. The generated power may be enough for a small farm due to the high efficiency of the proposed turbine. An another difference of this turbine from three-stage turbine is the larger diameter of the airscrew at equal diameters of the intake confusors of both wind turbines. The maximal diameters of the intake confusors are limited by the body size of utility vehicle. The pressure of the wind flow on the airscrew can be large enough, so the tower-support is made from metal corners or beams.

Figure 7:
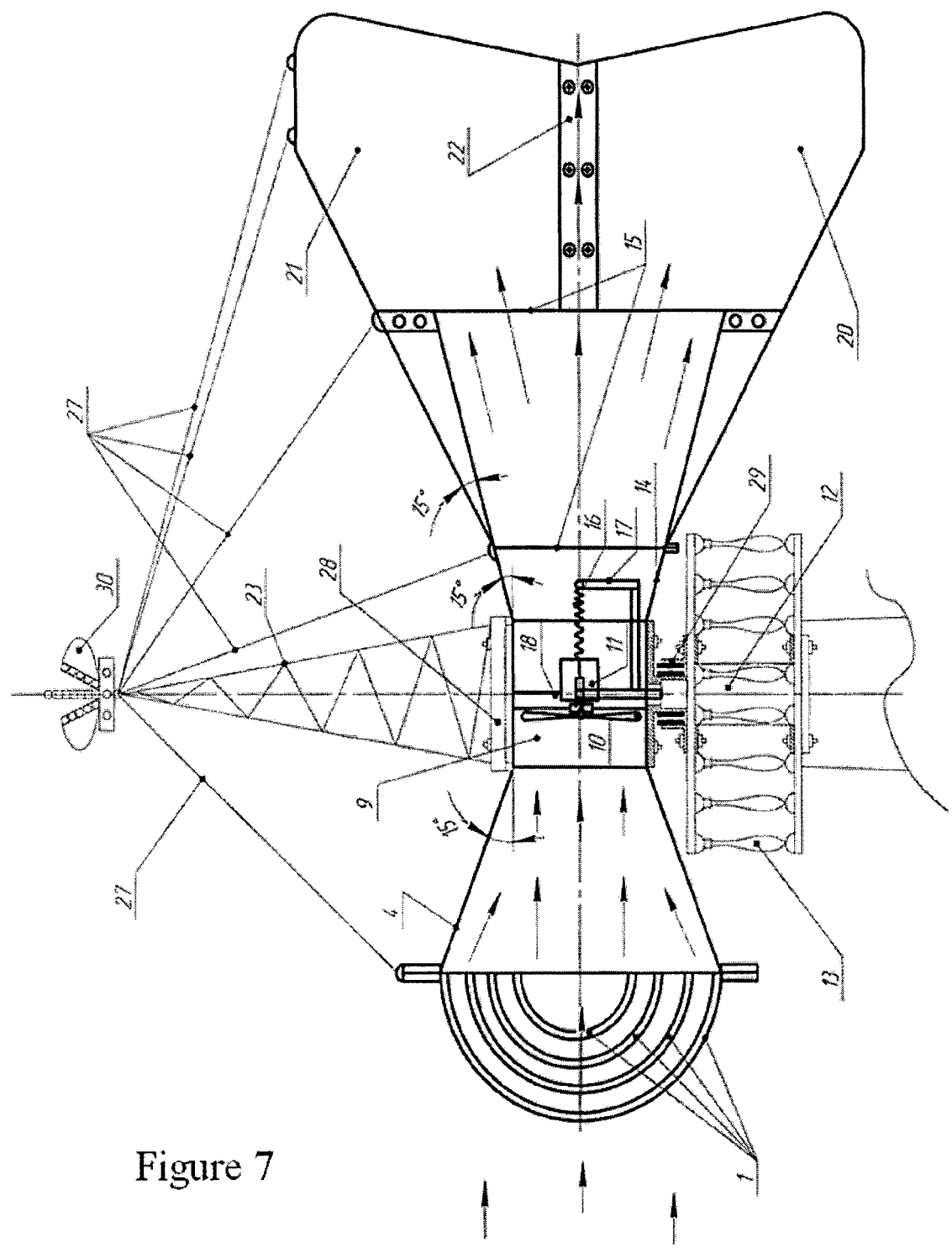

In FIG. 7 an enlarged scale of the movable part of single-stage wind turbine is shown. In this turbine, capture of the wind flow from the lateral surface is absent, and consequently, the power generated by this system is less than by previous wind turbines. Due to the small pressure of wind flow on the airscrew, it becomes possible to manufacture the plastic tower-support to reduce the cost of turbine and economy of natural materials. According to calculations, output power of single-stage wind turbine is quite sufficient to satisfy the needs in electricity of a private house. Diameter of the airscrew for single-stage wind turbine is the largest, but not exceeds 1 meter at the same requirements on dimensions of the vehicle body.

Figure 8:
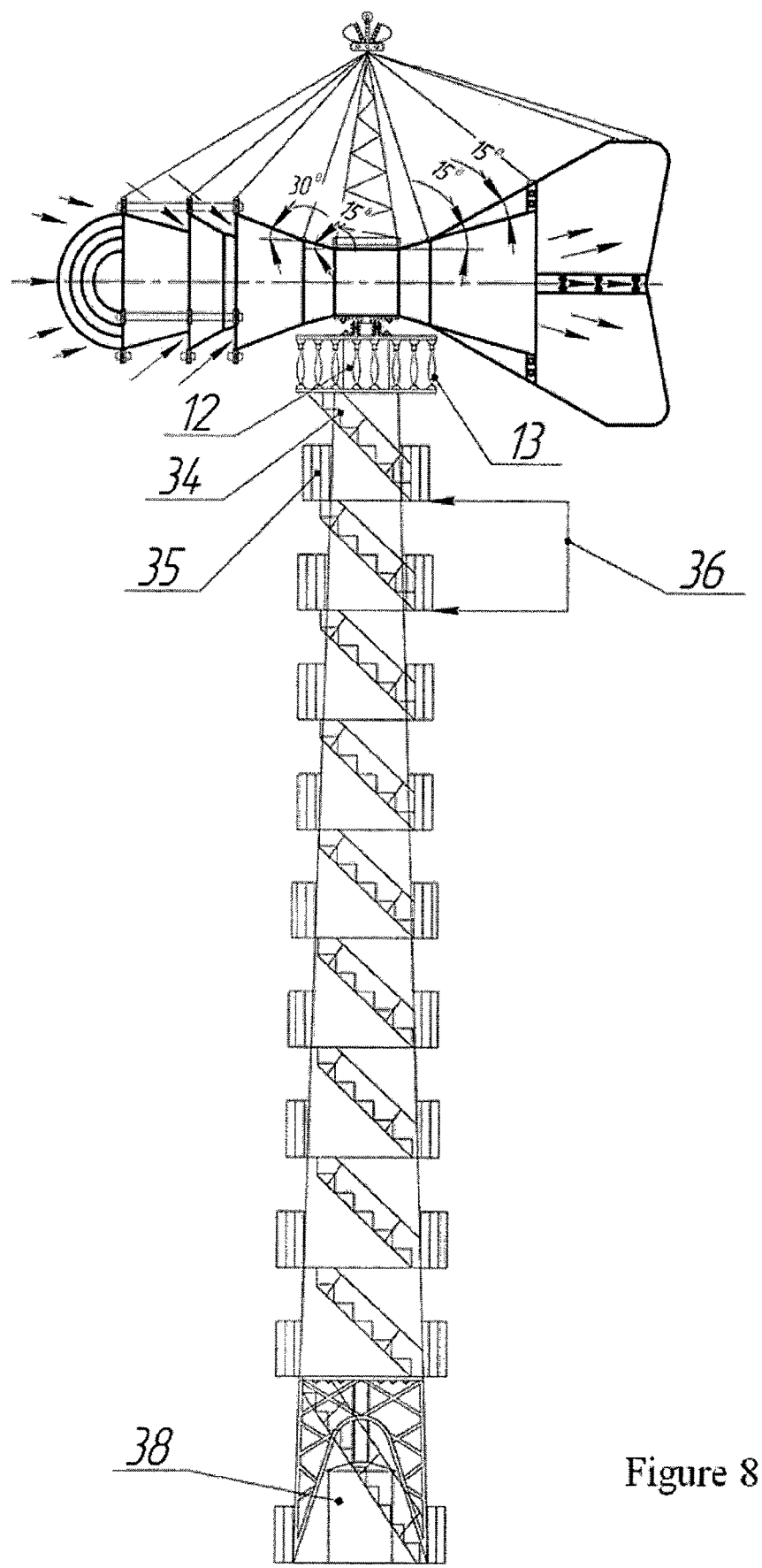

A fixed tower-support with stairs 34 and fences 35 for the staff on each section is shown in FIG. 8. In this figure, for clearness, the tower-support is shown in a simplified form, because the central-part of mast-support is not shown, which is done according FIG. 1.

Figure 9:
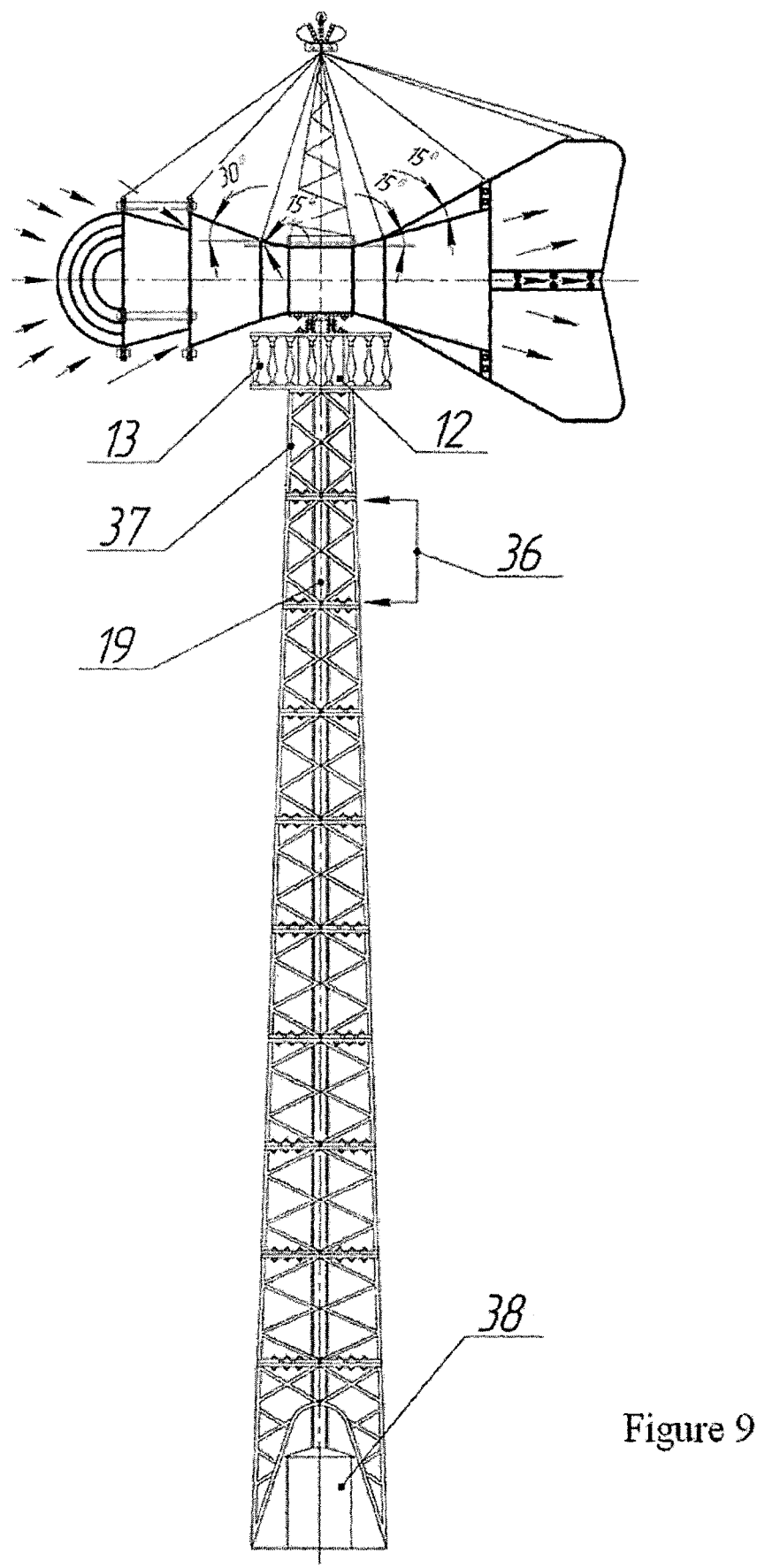

In FIG. 9, a simplified general view of a two-stage wind turbine is presented, consisting of a movable functional working part and the fixed part, which is a tower-support.

Figure 10:
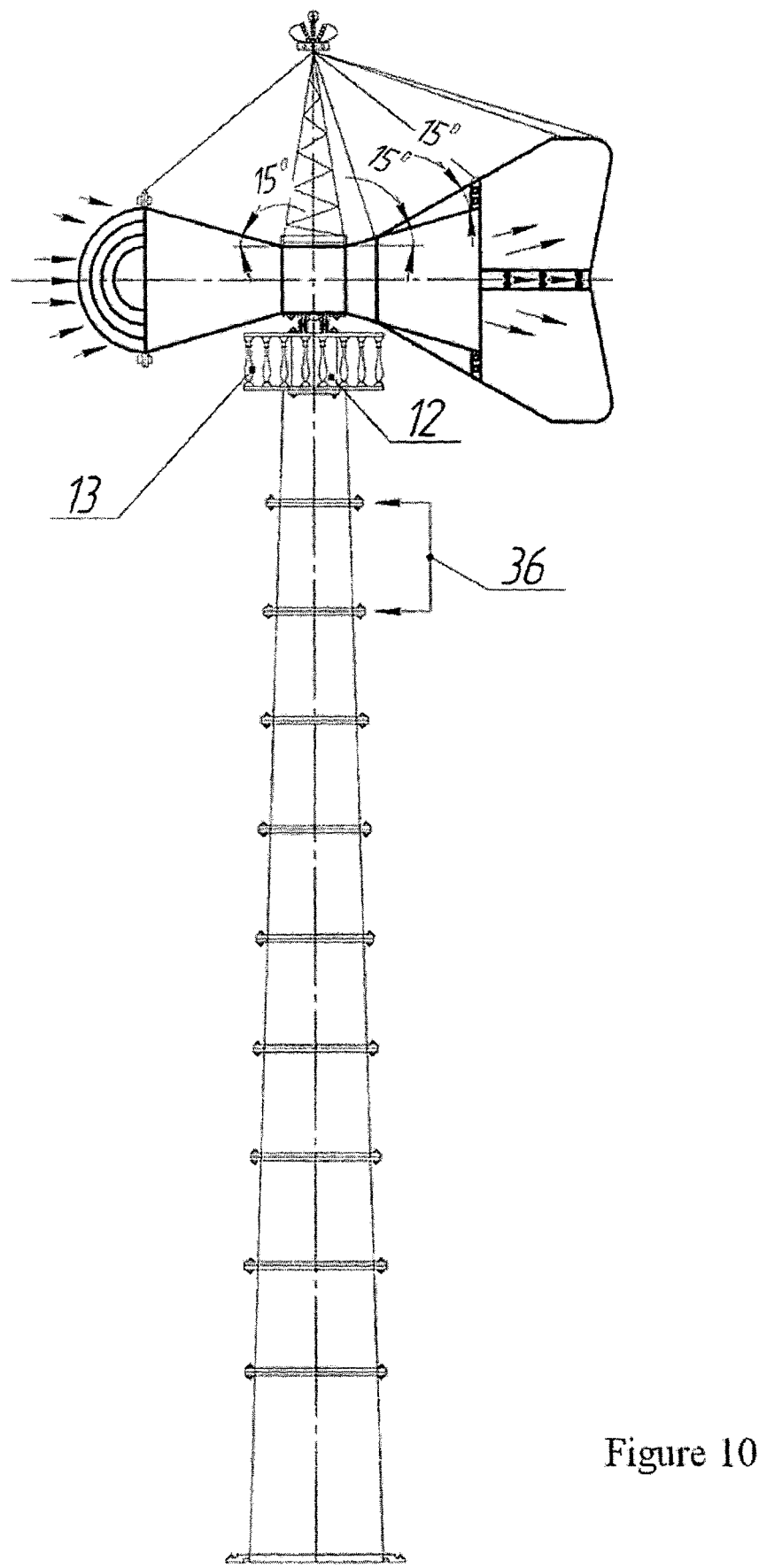

In FIG. 10, a version of the tower-support without stairs and fences to service the single-stage wind turbine is shown. The wind pressure on the airscrew can be quite significant in the case of a three-stage or two-stage wind turbine, so the tower-support made of steel corners or beams. In the future, the experimental determination of this value at the maximum operating wind speed of 30-50 m/s is required. In the case of low wind pressure in order to save natural materials, in particular iron, the mast can be manufactured from plastic, as is done for a single-stage wind turbine. The number of stages can be more.

The fixed part of the wind turbine is the tower-support and implemented in a modular form. The top module 13 is a square platform for the maintenance staff to regular maintenance and repair, if necessary, of the movable part of wind turbines. All ten below lying modules 36 (FIGS. 8-10) consist of power bearing beams 37, stairs 34, fences 35 for safe work of the staff, and the pipes 19, inside of which the cables for the transmission of electricity to the consumer are placed. A cylindrical box 38 for placing of the electrical equipment is in the lower module. All modules are interconnected by bolts. Modular design of tower-support (mast) permits easy transport it without special transport vehicle. Moreover, its assembling to the desired height and dismantling are carried out without the use of a crane by three working personnel. Mast in this particular execution consists of 9 equal height (1800 mm) sections-modules. The height of the 10-s bottom section is 3000 mm. The height of turbine from the Earth surface up to the horizontal axis of airscrew is 21 m.

In order to make wind turbines architectural appeal, all the stairs and fences are made in a decorative design.

Wind Turbine Operation

The wind turbine due to the weather vanes 20 and 21 (FIG. 2) is sufficiently accurately setted according the wind. Directional air flow (wind) going through a series of concentrators 1 made in the form of semirings with aerodynamic forms is pre-accelerated. Further, the wind flow enters the first stage of wind turbine, consisting of short confusor 2 and short virtual neck 5 with optimal aerodynamic angles and dimensions to accelerate the air flow. The wind flow passing through confusor 2 is accelerated. Optimal dimensions of confusor 2 provides minimal loss of wind speed due to friction with the inner confusor surface. The wind flow passing through virtual neck 5 does not feel resistance of the neck walls because of their lack. Short length of the virtual neck 5 does not promote to noticeable increase in the divergence angle of the wind flow. The airflow directed forward on this section causes a suction of an additional air mass from the environment due to injection-ejection through confusor 7 located at the periphery.

Simultaneously with the intake air of the injection-ejection, the wind flow enters to the space of virtual neck, moving from outside along the walls of the confusor 2 in accordance with the Coanda's effect, as well as the external wind flow.

Wind flow captured by peripheral confusor 7, is also accelerated. Further this wind stream is mixed with the main central stream and enters to the confusor 3 of the second stage. Speed of the directed air mass flowing into the second confusor and to the second virtual neck 6 substantially exceeds the velocity of the wind flow, entering to the first confusor and to the first virtual neck. The physical process, described for the first stage of wind turbine, is completely repeated for the second stage. Finally, this accelerated wind flow enters to the confusor 4 of third stage of wind turbine. At this stage wind flow is accelerated again. As a result, in a small volume before the airscrew, a powerful air dam is formed, similar to a water dam with a great force of pressure. Thus, the scattered power of wind flow is concentrated in a small volume before the airscrew. This is how works the pressure part of the proposed wind device. According to calculations, it is optimally to have 2-3-fold increase in wind speed after each stage.

The airscrew 10 and the box with a bevel gear in oil 11 are located in the Venturi neck of the third stage of wind turbine, at placing a generator outside of this neck. There is a small virtual slit between the peripheral part of the airscrew and the inner surface of the Venturi neck. A part of the wind flow passes freely through this slit and hence the rate of this part of flow is some higher, in spite of the proximity of the smooth surface of the neck. Behind the airscrew, air from the central exhaust flow is sucked into this part of the flow of high speed, resulting in a reduction of air pressure in the central flow. Traction arises as a result of this pressure difference, which promotes suction of the air flow from the front part of the airscrew. This circumstance partly compensates a negative impact of rotating airscrew on the flow speed.

Another equally important advantage of this rapid slit airflow is preventing of the occurrence of turbulence of the exhaust air-flow behind the airscrew and its separation from the wall of the diffuser in the case of a large disclosure angle of the diffuser to reduce its length. The diffuser is divided to two equal parts at some distance from the neck by means of a vertical plane 15, which additionally increases the velocity of the exhaust wind flow and prevents it turbulence. Moreover, this vertical plane promotes to a higher rarefaction of the air flow behind the airscrew and additionally increases the traction. Finally, by placing the airscrew at the optimal distance from boundary between the confusor and the neck corresponding to minimal pressure, it is possible to achieve significant rarefaction of the air flow behind the airscrew. So works the exhaust part of proposed wind device.

Figure 11A:
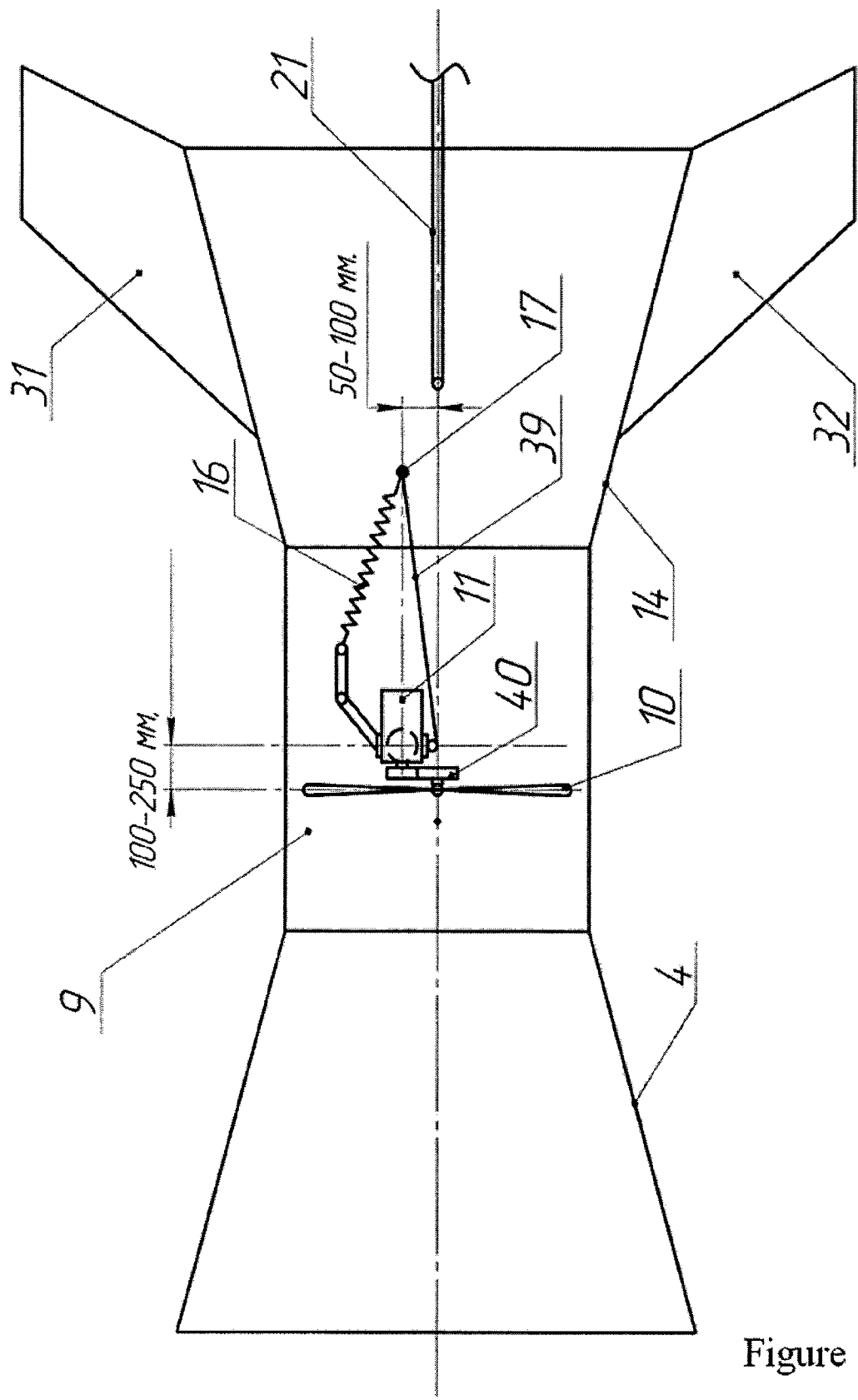
Figure 11B:
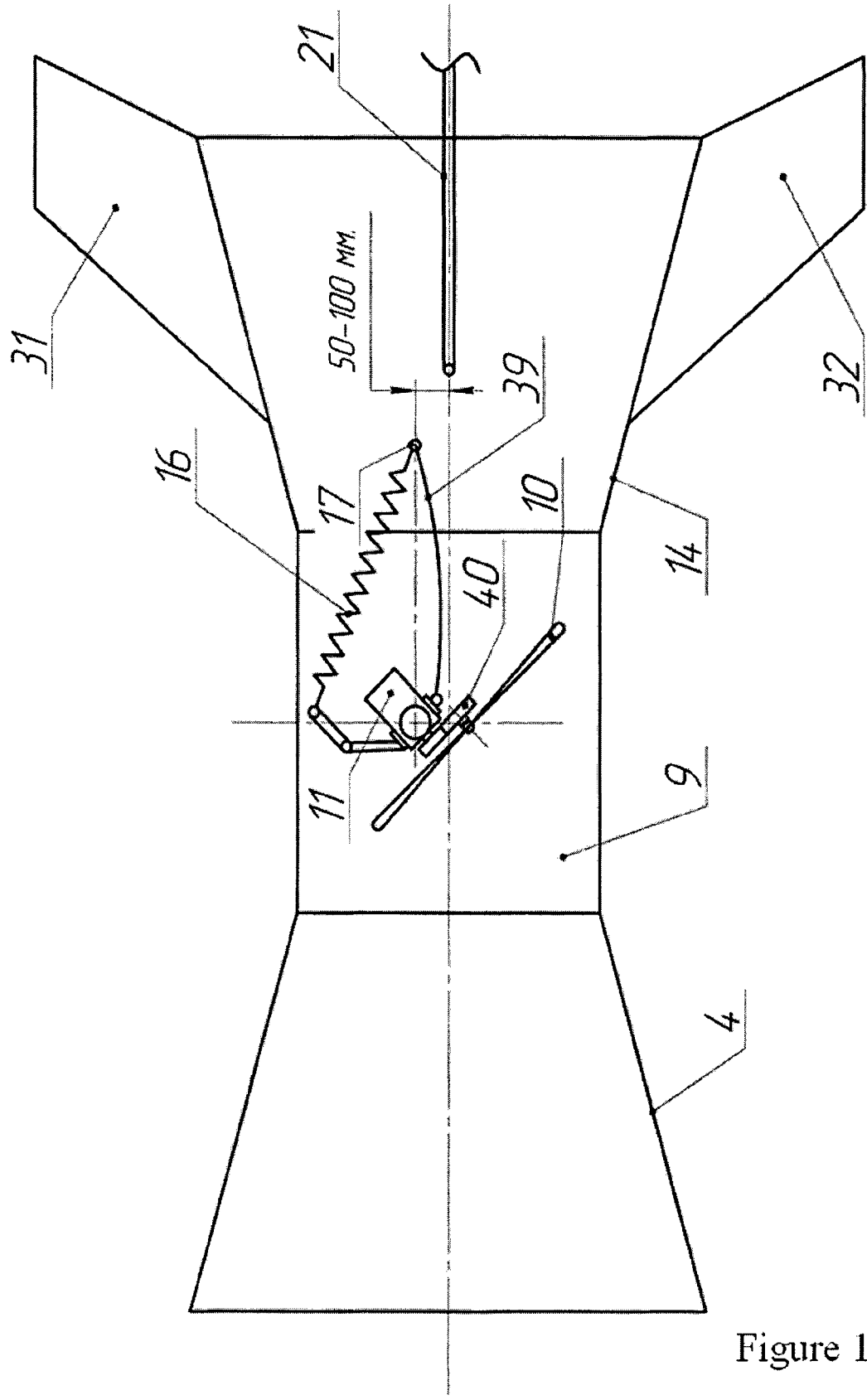
Figure 11C:
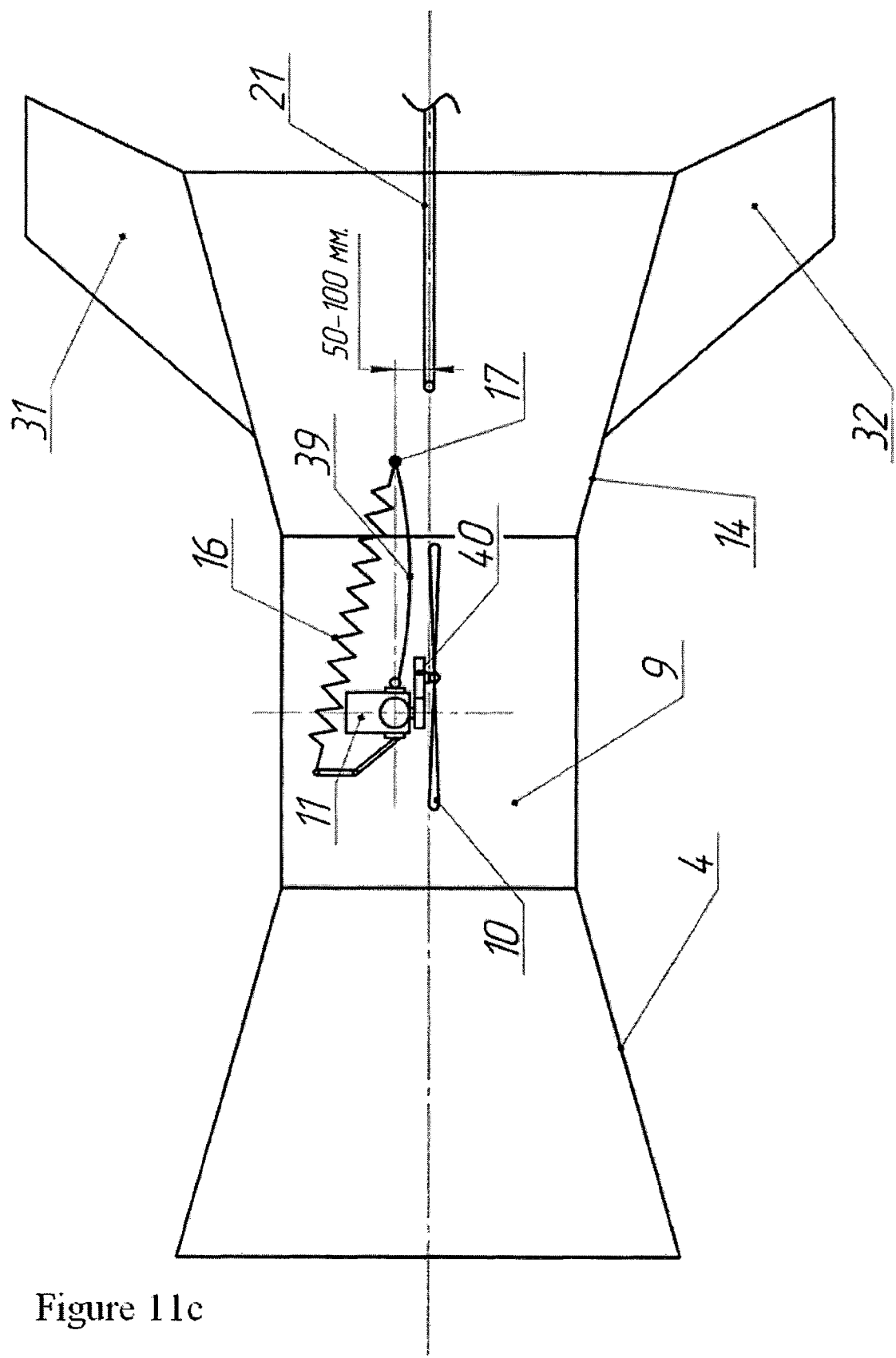

In the FIG. 11a, b, c, a classic method of wind turbine protection from destruction at hurricane wind with some modification is given. For this purpose, the horizontal axis of the box with the bevel gear, or the generator 11 is offset for some distance from the horizontal axis of the airscrew. Gearbox or generator is secured on the power frame 18 (FIG. 2). When the wind speed is less than the nominal operating speed, the airscrew is located perpendicular to the direction of air flow (FIG. 11a). When the wind speed begins to exceed the maximum operating value, the wind pressure on the front part of the airscrew begins to exceed the elastic force of the spring 16, whereby the airscrew begins to deflect on some angle from a frontal impact of the wind flow. Airscrew continues to work from the lateral influence of the wind flow (FIG. 11b). The spring begins to stretch for a greater length. And finally, when the wind speed reaches the calculated value of withdrawal of the airscrew from the wind exposure, the operation of the wind turbine is stopped and the airscrew takes the position parallel to the direction of motion of the wind flow (FIG. 11c). The spring is stretched to its maximum length. A spring is secured on the stationary rod 17. A thin flexible cable 39 is fixed on the same rod 17 and connected to gearbox (or a generator) for fixing of airscrew in a vertical position. The multiplier 40 together with the gearbox 11 allows to adjust the rotation speed of the airscrew within the specified limits.

Figure 12:
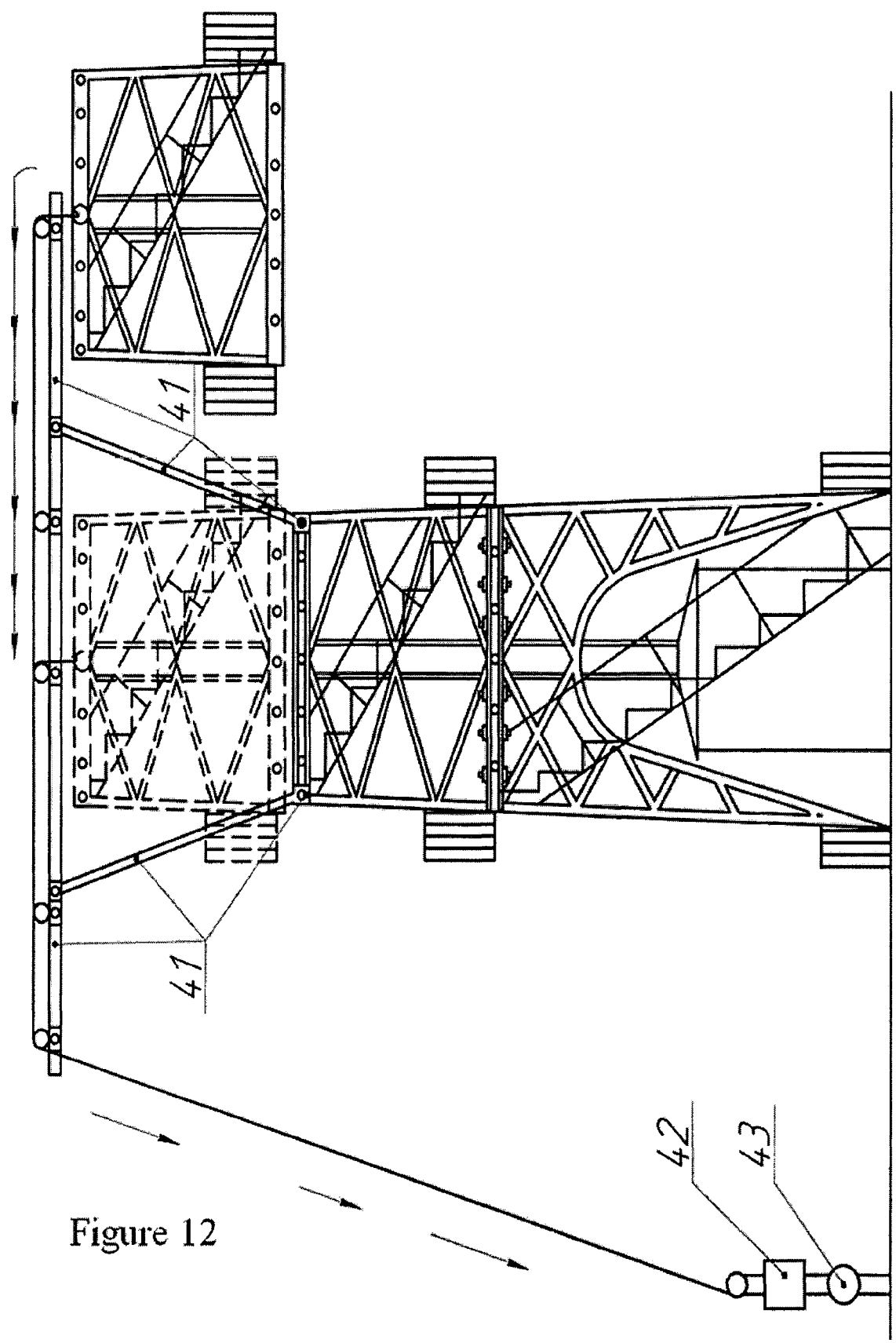

In the FIG. 12, the assembling process of the third stage of tower-support of wind turbine is shown. Using a simple collapsible hoist 41 and winches 42, fixed to the screw 43, screwed into the ground, each section of the tower assembles one after the other. Sections are fixed together by screws. After fixing of subsequent section to the upper part of the previous section, hoist is disassembled and then again attached to the top of the last assembled section. The free end of the steel cable goes down to Earth's surface and clings to the next section. Then, using the winch this section is lifted up. The movable part of wind turbine is pre-assembled on the Earth surface, and only then is lifted up and by means of power bearings is secured to the fixed part of the mast. So, the process of tower-support assembly is taken place.

Figure 13A:
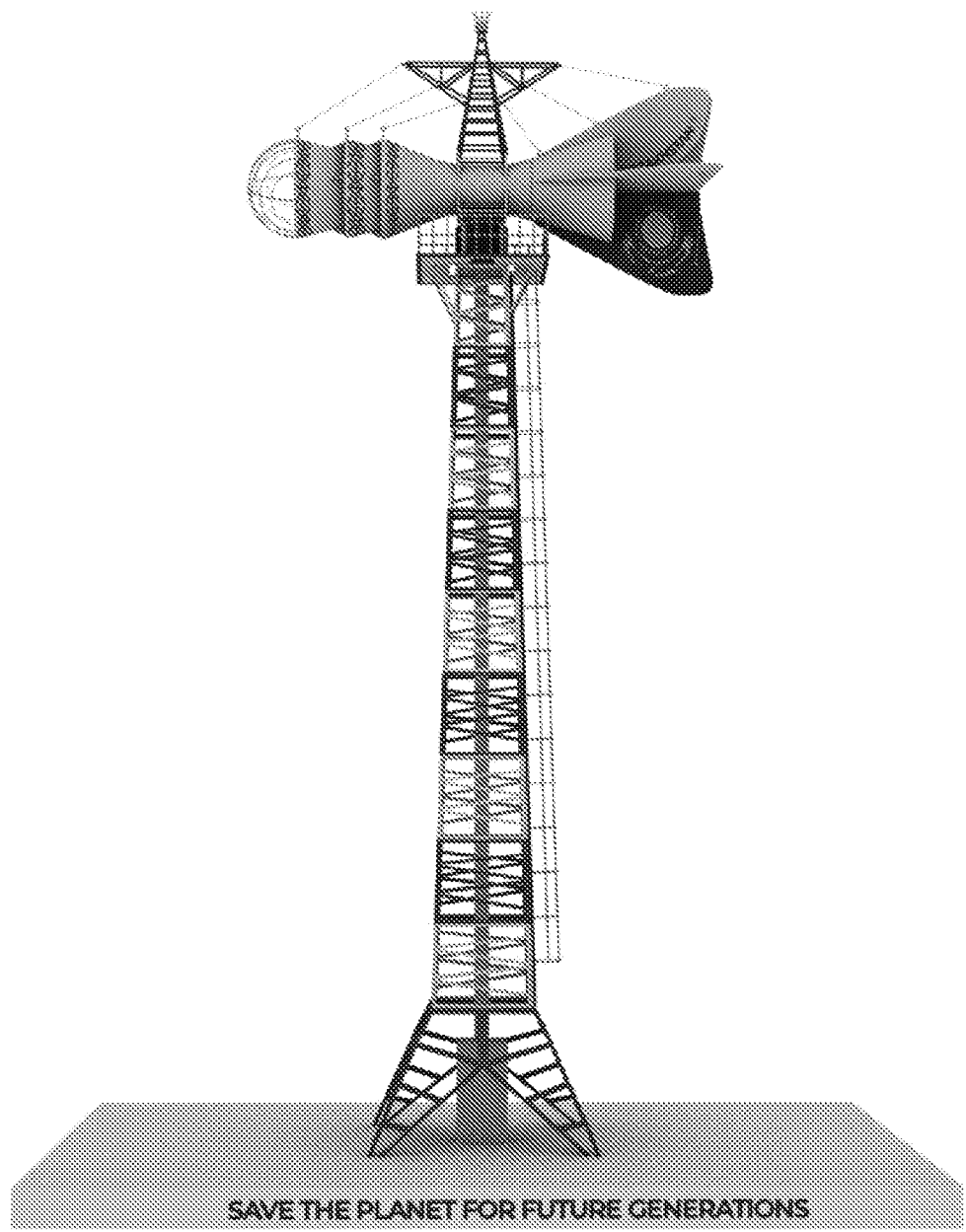
Figure 13B:
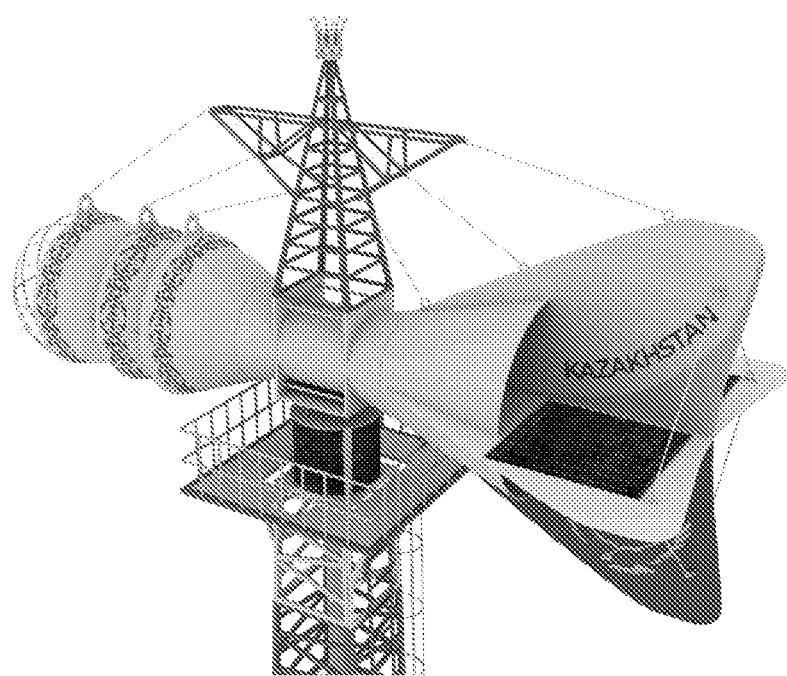

In order to reduce the cost of manufacturing the tower, it can be made in a simplified version with separate sections fixed with screws, as shown in FIG. 13a (general view of the wind turbine) and 13b (detailed view of the upper part of the wind turbine) in a perspective view.

The invention claimed is:
1. A multistage slotted wind turbine, consisting of a stationary tower-reliance and movable wind pipe including concentrators, several serially connected modules, consisting of central and peripheral confusors interconnected with each other through virtual necks formed between the confusors, which confusors are connected to a Venturi tube, blades joined to a generator, a wind vane, and lighting-conductor, characterized in that the movable wind pipe has no bends that change a direction of a wind flow, and includes a diffuser having an inner vertical partition, separating the diffuser into two equal parts for increasing a speed of exhaust air flow, wherein the height of the partition exceeds the diameter of the diffuser, that allows protruding parts of the diffuser to serve as the wind vane and at the same time as a vertical stabilizer, and wherein the diffuser is provided with two horizontal stabilizers, and wherein the blades are arranged inside a Venturi neck, forming a virtual slit that additionally increases the speed of the airflow.

2. The multistage slotted wind turbine according to claim 1, characterized in that protection of the wind turbine against hurricanes is located inside of the Venturi tube.

3. The multistage slotted wind turbine according to claim 1, characterized in that the movable wind pipe is provided by a power spire connected with steel cables to the confusors and the diffuser.

4. The multistage slotted wind turbine according to claim 1, characterized in that the tower-reliance is modular, and each section is provided with a staircase and fences.

5. The multistage slotted wind turbine according to claim 1, wherein the lighting-conductor is in the form of a royal crown for protecting the system from lightning strikes.

* * * * *